(12) United States Patent
Okamoto (10) Patent No.: US 11,557,764 B2
(45) Date of Patent: Jan. 17, 2023

(54) POSITIVE ELECTRODE ACTIVE MATERIAL FOR LITHIUM ION SECONDARY BATTERY, LITHIUM ION SECONDARY BATTERY, AND METHOD FOR PRODUCING POSITIVE ELECTRODE ACTIVE MATERIAL FOR LITHIUM ION SECONDARY BATTERY

(71) Applicant: SUMITOMO METAL MINING CO., LTD., Tokyo (JP)

(72) Inventor: Ryosuke Okamoto, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 434 days.

(21) Appl. No.: 16/762,625

(22) PCT Filed: Nov. 9, 2018

(86) PCT No.: PCT/JP2018/041602
§ 371 (c)(1),
(2) Date: May 8, 2020

(87) PCT Pub. No.: WO2019/093462
PCT Pub. Date: May 16, 2019

(65) Prior Publication Data
US 2020/0280069 A1 Sep. 3, 2020

(30) Foreign Application Priority Data
Nov. 10, 2017 (JP) .............................. JP2017-217552

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 10/0525* (2013.01);
(Continued)

(58) Field of Classification Search
None
See application file for complete search history.

(56) References Cited

U.S. PATENT DOCUMENTS

2011/0287321 A1* 11/2011 Hiraki .................. H01M 4/366
429/231.9

FOREIGN PATENT DOCUMENTS

| JP | 2004-319105 A | 11/2004 |
|---|---|---|
| JP | 2008-103204 A | 5/2008 |

(Continued)

OTHER PUBLICATIONS

Dec. 25, 2018 Search Report issued in International Patent Application No. PCT/JP2018/041602.

*Primary Examiner* — Wyatt P McConnell
(74) *Attorney, Agent, or Firm* — Oliff PLC (57) ABSTRACT

A positive electrode active material for a lithium ion secondary battery, includes lithium-nickel composite oxide particles and a coating layer that covers at least a part of surfaces of the lithium-nickel composite oxide particles, in which components other than oxygen of the lithium-nickel composite oxide are represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, or W, $0.95 \leq t \leq 1.20$, $0 < x \leq 0.22$, and $0 \leq y \leq 0.15$), the coating layer contains a Ti compound, and a Ti amount per 1 $m^2$ surface area of the lithium-nickel composite oxide is 7.0 µmol or more and 60 µmol or less.

10 Claims, 2 Drawing Sheets

(51) Int. Cl.
      *H01M 10/0525*    (2010.01)
      *H01M 50/46*      (2021.01)
      *H01M 4/02*       (2006.01)

(52) U.S. Cl.
      CPC ...... *H01M 50/46* (2021.01); *H01M 2004/021* (2013.01); *H01M 2004/027* (2013.01); *H01M 2004/028* (2013.01)

(56) References Cited

FOREIGN PATENT DOCUMENTS

| | | |
|---|---|---|
| JP | WO2010/090185 A1 | 8/2012 |
| JP | 5181554 B2 | 4/2013 |
| JP | 2013-137947 A | 7/2013 |
| JP | 5761098 B2 | 8/2015 |
| JP | 5831457 B2 | 12/2015 |
| JP | 2016-81855 A | 5/2016 |
| JP | 2016-143490 A | 8/2016 |
| JP | 2017-84513 A | 5/2017 |
| JP | 2017-188211 A | 10/2017 |

\* cited by examiner

POSITIVE ELECTRODE ACTIVE MATERIAL FOR LITHIUM ION SECONDARY BATTERY, LITHIUM ION SECONDARY BATTERY, AND METHOD FOR PRODUCING POSITIVE ELECTRODE ACTIVE MATERIAL FOR LITHIUM ION SECONDARY BATTERY

BACKGROUND OF THE INVENTION

Field of the Invention

The present invention relates to a positive electrode active material for a lithium ion secondary battery comprising lithium-nickel composite oxide particles and a coating layer that covers at least a part of the lithium-nickel composite oxide particles, a lithium ion secondary battery, and a method for producing a positive electrode active material for a lithium ion secondary battery. This application is based upon and claims the benefit of priority of the prior Japanese Patent Application No. 2017-217552 filed on Nov. 10, 2017 in Japan, the entire contents of which are incorporated herein by reference.

Description of Related Art

In recent years, it has been strongly desired to develop small-sized and lightweight secondary batteries having a high energy density and durability with the spread of portable information terminals such as smartphones and tablet PCs. Moreover, it has been strongly desired to develop high-output secondary batteries as a power source for electric cars such as hybrid cars or as large-sized secondary batteries for power storage.

As secondary batteries satisfying such a demand, there are lithium ion secondary batteries. Lithium ion secondary batteries include a negative electrode, a positive electrode, an electrolyte and the like, and materials capable of deintercalating and intercalating lithium are used as active materials used in the negative electrode and the positive electrode. Research and development of such lithium ion secondary batteries are currently actively conducted. Among these, lithium ion secondary batteries containing a lithium-metal composite oxide as a positive electrode material can provide a voltage of 4-V class and are thus put to practical use as a secondary battery having a high energy density.

Among these, lithium-nickel composite oxides that can realize secondary batteries equipped with a high battery capacity without using cobalt that is a resource with a small reserve have attracted attention in recent years, as materials having a high energy density.

However, as compared with other lithium-transition metal composite oxides, lithium-nickel composite oxides have a problem that the battery capacity decreases as charge and discharge are repeated, namely, a problem that the cycle characteristics are inferior, and a problem that the battery greatly expands by gas generation when charge and discharge are repeated.

One of the factors which cause this decrease in battery capacity and the gas generation is a reaction between $Li_{1-x}NiO_2$ and the electrolyte solution in a charged state. The capacity decreases as oxygen is deintercalated from $Li_{1-x}NiO_2$ and an electrochemically inactive NiO phase is formed. The deintercalated oxygen oxidizes the electrolyte solution; thus $CO_2$ is generated, and the battery expands. All of these reactions are likely to occur near the surface of the active material, and it is thus considered to be important to control the surface state of lithium-nickel composite oxide particles in order to improve the cycle characteristics of secondary batteries containing lithium-nickel composite oxide as a positive electrode active material and to suppress gas generation.

For example, Patent Literature 1 discloses that gas generation inside the battery can be suppressed by covering the surface of layered rock-salt type compound particles having a high Ni composition, in which Ni accounts for 60% to 90% of the total amount of all metal elements other than Li, with a mixture of titanium oxide and aluminum oxide.

In addition, Patent Literature 2 discloses that an effect of improving cycle characteristics is attained by covering lithium titanate on layered rock-salt type compound particles having a high Ni composition in which Ni accounts for 80% or more of the total amount of all transition metals.

Moreover, Patent Literatures 3 to 5 disclose that the cycle characteristics are improved by uniformly forming a coating layer of an oxide containing Ti on the surface of a lithium-containing composite oxide.

Patent Literature 1: JP 5181554 B2
Patent Literature 2: JP 2013-137947 A
Patent Literature 3: JP 5761098 B2
Patent Literature 4: JP 5831457 B2
Patent Literature 5: JP 2016-81855 A

SUMMARY OF INVENTION

However, in all the proposals, it is not reported that the achievement of both excellent capacity and cycle characteristics and prevention of battery swelling due to gas generation is investigated. In particular, particles having a high Ni composition in which Ni accounts for 60% or more of the total amount of metal elements other than Li have not been verified, and the gas generation problem peculiar to the high Ni composition has been unknown.

Accordingly, in view of the above problems of the related art, an object of the present invention is to provide a positive electrode active material for a lithium ion secondary battery, which has a high capacity and exhibits excellent cycle characteristics, suppresses battery swelling due to gas generation, and both of which are achieved at a high level.

The positive electrode active material for a lithium ion secondary battery according to one embodiment of the present invention is a positive electrode active material for a lithium ion secondary battery comprising lithium-nickel composite oxide particles and a coating layer that covers at least a part of surfaces of the lithium-nickel composite oxide particles, in which the lithium-nickel composite oxide is represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, and W, 0.95≤t≤1.20, 0<x≤0.22, and 0≤y≤0.15), the coating layer contains a Ti compound, and a Ti amount per 1 $m^2$ surface area of the lithium-nickel composite oxide is 7.0 μmol or more and 60 μmol or less.

In this manner, it is possible to provide a positive electrode active material for a lithium ion secondary battery, which has a high capacity and exhibits excellent cycle characteristics, suppresses battery swelling due to gas generation, and both of which are achieved at a high level.

At this time, in one embodiment of the present invention, a quotient of an amount ratio (Tis/Nis) of Ti to Ni that are present on a surface of the positive electrode active material for a lithium ion secondary battery and a ratio (Nib/(Nib+Cob+Mb)) of an amount of Ni to a sum of amounts of Ni, Co, and M in an entire positive electrode active material may be set to 0.07 or more and 0.30 or less.

In this manner, it is possible to provide a positive electrode active material for a lithium ion secondary battery, which has a high capacity and exhibits excellent cycle characteristics, suppresses battery swelling due to gas generation, and both of which are achieved at a higher level.

At this time, in one embodiment of the present invention, a carbon content may be set to 0.05% by mass or more and 0.40% by mass or less with respect to 100% by mass of the entire positive electrode active material for a lithium ion secondary battery.

In this manner, it is possible to sufficiently suppress the generation of carbon dioxide due to decomposition of the organic components contained in the coating layer, to prevent the occurrence of battery expansion and the like, and to further suppress battery swelling due to gas generation.

At this time, in one embodiment of the present invention, the carbon content may be set to 0.08% by mass or less.

In this manner, the organic components contained in the coating layer further decreases, and it is thus possible to sufficiently suppress the generation of carbon dioxide due to decomposition and the like, and to prevent the occurrence of battery expansion and the like.

At this time, in one embodiment of the present invention, a specific surface area of the lithium-nickel composite oxide may be set to 0.1 $m^2/g$ or more and 1.0 $m^2/g$ or less.

In this manner, the deintercalation and intercalation of lithium ions is sufficiently promoted, and it is thus possible to decrease the internal resistance of the secondary battery when being charged and discharged, and to provide a positive electrode active material for a lithium ion secondary battery having both of the above functions at a higher level.

At this time, in one embodiment of the present invention, the lithium-nickel composite oxide may be a layered rock-salt type compound particle having a crystal structure belonging to a space group R-3m.

In this manner, the layered rock-salt type oxide having an "R-3m" structure can suppress the internal resistance particularly in a case in which a positive electrode active material containing lithium-nickel composite oxide particles is used in a secondary battery.

In one embodiment of the present invention, a lithium ion secondary battery is characterized by comprising at least a positive electrode using the positive electrode active material for a lithium ion secondary battery, a negative electrode, a separator, and a non-aqueous electrolyte solution.

In this manner, it is possible to provide a positive electrode active material for a lithium ion secondary battery, which has a high capacity and exhibits excellent cycle characteristics, suppresses battery swelling due to gas generation, and both of which are achieved at a high level.

One embodiment of the present invention is a method for producing a positive electrode active material for a lithium ion secondary battery comprising lithium-nickel composite oxide particles and a coating layer that covers at least a part of surfaces of the lithium-nickel composite oxide particles, at least comprising: a precursor crystallization process for preparing a nickel composite hydroxide that is a precursor of the lithium-nickel composite oxide by a crystallization reaction; an oxidizing roasting process for oxidizing and roasting the nickel composite hydroxide obtained in the precursor crystallization process to obtain a nickel composite oxide; a lithium-nickel composite oxide synthesis process for mixing the nickel composite oxide obtained in the oxidizing roasting process with a lithium compound to obtain a mixture and firing the mixture at a temperature of 700° C. or more and 800° C. or less in an oxygen-containing atmosphere to obtain a lithium-nickel composite oxide; and a coating process for forming the coating layer containing a Ti compound on at least a part of surfaces of particles of the lithium-nickel composite oxide obtained in the lithium-nickel composite oxide synthesis process, wherein, in the coating process, a Ti compound is added so that a Ti amount attributed to the Ti compound is 7.0 μmol or more and 60 μmol or less per 1 $m^2$ surface area of the lithium-nickel composite oxide, the lithium-nickel composite oxide obtained in the coating process is represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, and W, 0.95≤t≤1.20, 0<x≤0.22, and 0≤y≤0.15), and a quotient of an amount ratio (Tis/Nis) of Ti to Ni that are present on a surface of the positive electrode active material for a lithium ion secondary battery and a ratio (Nib/(Nib+Cob+Mb)) of an amount of Ni to a sum of amounts of Ni, Co, and M in an entire positive electrode active material is 0.07 or more and 0.30 or less.

In this manner, it is possible to provide a positive electrode active material for a lithium ion secondary battery, which has a high capacity and exhibits excellent cycle characteristics, suppresses battery swelling due to gas generation, and both of which are achieved at a high level.

According to the present invention, it is possible to provide a positive electrode active material for a lithium ion secondary battery, which has a high capacity and exhibits excellent cycle characteristics, suppresses battery swelling due to gas generation, and both of which are achieved at a high level.

BRIEF DESCRIPTION OF THE DRAWINGS

FIG. 3 is a diagram illustrating a laminate-type battery used for evaluation of battery characteristics.

DETAILED DESCRIPTION OF THE INVENTION

As a result of keen examination to solve the above-mentioned problems, the present inventors have found that it is possible to achieve high capacity and excellent cycle characteristics, and to suppress battery swelling due to gas generation, both at a high level, by comprising lithium-nickel composite oxide particles and a coating layer containing a specific amount of a titanium compound on at least a part of the surfaces of the lithium-nickel composite oxide particles, and thus completed the present invention. Hereinafter, suitable embodiments of the present invention will be described.

It should be noted that the present embodiment described below does not unduly limit the contents of the present invention described in the claims and can be modified without departing from the gist of the present invention. Moreover, not all of the configurations described in the present embodiment are necessary as means for solving the present invention. Explaining about a positive electrode active material for a lithium ion secondary battery, a lithium ion secondary battery, and a method for producing a positive electrode active material for a lithium ion secondary battery according to one embodiment of the present invention in the following order.

1. Positive electrode active material for lithium ion secondary battery
   1-1. Lithium-nickel composite oxide particles
   1-2. Coating layer
   1-3. Characteristics of positive electrode active material
2. Method for producing positive electrode active material for lithium ion secondary battery
   2-1. Precursor crystallization process
   2-2. Oxidizing roasting process
   2-3. Lithium-nickel composite oxide synthesis process
   2-4. Coating process
3. Lithium ion secondary battery
   3-1. Positive electrode
   3-2. Negative electrode
   3-3. Separator
   3-4. Non-aqueous electrolyte solution
   3-5. Shape and configuration of secondary battery
   3-6. Characteristics of secondary battery <1. Positive Electrode Active Material for Lithium Ion Secondary Battery>

The positive electrode active material for a lithium ion secondary battery (hereinafter, referred to as "positive electrode active material") according to one embodiment of the present invention comprises lithium-nickel composite oxide particles and a coating layer that covers at least a part of the surfaces of the lithium-nickel composite oxide particles. The components other than oxygen of the lithium-nickel composite oxide are represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, and W, $0.95 \leq t \leq 1.20$, $0 < x \leq 0.22$, and $0 \leq y \leq 0.15$)

Moreover, the coating layer contains a Ti compound and the Ti amount per 1 m$^2$ surface area of the lithium-nickel composite oxide is 7.0 μmol or more and 60 μmol or less. Hereinafter, it is explained concretely about the positive electrode active material for a lithium ion secondary battery (hereinafter, also simply referred to as "positive electrode active material") of the present embodiment.

The positive electrode active material according to one embodiment of the present invention can comprise lithium-nickel composite oxide particles and a coating layer that covers at least a part of the lithium-nickel composite oxide particles. Hereinafter, it is explained about the lithium-nickel composite oxide particles and the coating layer.

<1-1. Lithium-Nickel Composite Oxide Particles>

The lithium-nickel composite oxide particles can contain lithium (Li), nickel (Ni), cobalt (Co), an element M (M) so that the amount ratio is Li:Ni:Co:M=t:1−x−y:x:y.

In the formula representing the amount ratio of each element in the lithium-nickel composite oxide, the value of t indicating the amount ratio of lithium (Li) can be set to 0.95 or more and 1.20 or less and is preferably 0.98 or more and 1.10 or less, more preferably 1.00 or more and 1.10 or less.

By setting the value of t to 0.95 or more, it is possible to suppress the internal resistance of a secondary battery fabricated using a positive electrode active material containing the lithium-nickel composite oxide and to improve the output characteristics. In addition, by setting the value of t to 1.20 or less, it is possible to increase the initial discharge capacity of a secondary battery fabricated using a positive electrode active material containing the lithium-nickel composite oxide. In other words, by setting the value of t to the above range, it is possible to improve the output characteristics and capacity characteristics of a secondary battery fabricated using a positive electrode active material containing the lithium-nickel composite oxide.

Nickel (Ni) in the above lithium-nickel composite oxide is an element which contributes to capacity enlargement of a secondary battery fabricated using a positive electrode active material containing the lithium-nickel composite oxide.

Cobalt (Co) in the above lithium-nickel composite oxide is an element which contributes to a decrease in the irreversible capacity of a secondary battery fabricated using a positive electrode active material containing the lithium-nickel composite oxide. The value of x indicating the cobalt content can be set to more than 0 and 0.22 or less and is preferably 0.10 or more and 0.22 or less, more preferably 0.10 or more and 0.20 or less.

By setting the value of x to more than 0, it is possible to decrease the irreversible capacity, which is the difference between the charge capacity and the discharge capacity, in a secondary battery fabricated using a positive electrode active material containing the lithium-nickel composite oxide. In addition, by setting the value of x to 0.22 or less, it is possible to attain a high battery capacity.

In addition, the lithium-nickel composite oxide may contain an element M as an additive element in addition to the above metal elements. As the element M, it is possible to use at least one element selected from magnesium (Mg), aluminum (Al), calcium (Ca), silicon (Si), titanium (Ti), vanadium (V), iron (Fe), copper (Cu), chromium (Cr), zinc (Zn), zirconium (Zr), niobium (Nb), molybdenum (Mo), and tungsten (W). The element M is selected accordingly depending on the application and required performance of a secondary battery fabricated using the positive electrode active material.

Some of the elements M themselves do not contribute to the redox reaction, and thus the value of y indicating the content of element M can be set to 0.15 or less and is preferably 0.10 or less, more preferably 0.05 or less. The lithium-nickel composite oxide is not required to contain the element M, and thus the lower limit of y indicating the content of element M can be set to 0.

With regard to the lithium-nickel composite oxide particles, it is preferable that a peak attributed to the layered rock-salt crystal structure of an "R-3m" structure is detected from the diffraction pattern acquired in the case of performing X-ray diffraction (XRD) measurement. In particular, it is more preferable that peaks only attributed to the layered rock-salt crystal structure of an "R-3m" structure are detected from the diffraction pattern. This is because it is preferable that the layered rock-salt type oxide having an "R-3m" structure can suppress the internal resistance particularly in a case in which a positive electrode active material containing lithium-nickel composite oxide particles is used in a secondary battery.

However, a lithium-nickel composite oxide having a layered rock-salt crystal structure is not obtained in a single phase, and there is a case in which an impurity phase is mixed. Even in a case in which an impurity phase is mixed in this way, it is preferable that the intensities of the peaks attributed to the impurity phase other than the layered rock-salt structure of an "R-3m" structure do not exceed the intensities of the peaks attributed to the layered rock-salt structure of an "R-3m" structure.

The lithium-nickel composite oxide particles are preferably independent primary particles or a mixture thereof. Here, the primary particles and the secondary particles can be confirmed under an electron microscope such as SEM or TEM. In the interior of the individual particles, there may be a space or void surrounded by one or more primary particles.

The specific surface area of the lithium-nickel composite oxide is preferably 0.1 m$^2$/g or more and 1.0 m$^2$/g or less, more preferably 0.1 m$^2$/g or more and 0.5 m$^2$/g or less. Deintercalation and intercalation of lithium ions occurring in the lithium-nickel composite oxide during charge and discharge of the secondary battery take place through the interface between the lithium-nickel composite oxide particles and the electrolyte solution, namely, through the surface of the lithium-nickel composite oxide. Hence, it is preferable to set the specific surface area of the lithium-nickel composite oxide contained in the positive electrode active material to 0.1 m$^2$/g or more since such deintercalation and intercalation of lithium ions is sufficiently promoted and the internal resistance of the secondary battery when being charged and discharged can be decreased. In addition, there is a case in which the electrolyte solution is decomposed by a side reaction occurring at the interface between the positive electrode active material and the electrolyte solution as described above, but excessive decomposition of the electrolyte solution can be suppressed by setting the specific surface area of the lithium-nickel composite oxide particles to 1.0 m$^2$/g or less.

The specific surface area of the lithium-nickel composite oxide according to one embodiment of the present invention can be measured by, for example, a BET method utilizing nitrogen adsorption.

The volume average particle size of the lithium-nickel composite oxide according to one embodiment of the present invention is preferably 2 μm or more and 20 μm or less, more preferably 2 μm or more and 15 μm or less, still more preferably 3 μm or more and 15 μm or less. This is because the battery capacity per capacity can be sufficiently increased and excellent battery characteristics such as high safety and high output can be attained in a secondary battery fabricated using a positive electrode active material containing the lithium-nickel composite oxide particles in the positive electrode, in a case in which the volume average particle size of the lithium-nickel composite oxide particles is 2 μm or more and 20 μm or less. Here, the volume average particle size can be measured using a laser light diffraction scattering particle size distribution meter and the like.

<1-2. Coating Layer>

The coating layer contains a compound containing titanium, namely, a titanium compound and covers at least a part of the lithium-nickel composite oxide particles. The coating layer can also contain only a titanium compound.

The coating layer and the lithium-nickel composite oxide particles do not necessarily have a clear boundary therebetween. For this reason, the coating layer refers to a portion or a region on the surface side of the positive electrode active material of the present embodiment in which the titanium concentration is higher than in the lithium-nickel composite oxide particles which are the material to be coated, namely, the central region. The coating layer may partially form a solid solution with the lithium-nickel composite oxide.

The titanium content in the coating layer is not limited particularly, but it is preferable to adjust the titanium content depending on the specific surface area of the lithium-nickel composite oxide to be coated. Specifically, for example, the coating layer contains titanium preferably at a proportion of 7.0 μmol or more and 60 μmol or less, more preferably at a proportion of 7.0 μmol or more and 30 μmol or less per 1 m$^2$ surface area of the lithium-nickel composite oxide particles.

This is because the coating layer can be uniformly disposed on the entire surface of the lithium-nickel composite oxide particles by setting the titanium content per 1 m$^2$ surface area of the lithium-nickel composite oxide particles to 7.0 μmol or more.

In addition, by providing the coating layer, the cycle characteristics can be improved and the battery swelling can be suppressed, but there is the possibility of an increase in the internal resistance at the same time. Moreover, it is preferable to set the titanium content per 1 m$^2$ surface area of the lithium-nickel composite oxide particles to 60 μmol or less, since it is possible to suppress the coating layer from hindering the reaction for lithium deintercalation and intercalation of the lithium-nickel composite oxide and to decrease the internal resistance.

The evaluation and calculation method of the titanium content in the coating layer are not particularly limited, but for example, the titanium content (μmol/g) in 1 g of the obtained positive electrode active material is measured by a method such as chemical analysis at first. For example, the titanium content can be measured by inductively coupled plasma (ICP) and the like. In addition, the specific surface area (m$^2$/g) of the lithium-nickel composite oxide particles before being subjected to the coating treatment with a titanium compound is measured by a BET method utilizing nitrogen adsorption, and the like. Thereafter, the titanium content (μmol/m$^2$) per 1 m$^2$ surface area of the lithium-nickel composite oxide particles can be calculated by dividing the titanium content (μmol/g) in 1 g of the obtained positive electrode active material by the specific surface area (m$^2$/g) of the lithium-nickel composite oxide particles before being subjected to the coating treatment.

In a case in which the lithium-nickel composite oxide before being subjected to the coating treatment contains titanium, it is preferable to use the difference in the titanium content before and after the coating treatment as the titanium amount used for the coating.

Incidentally, titanium in the coating layer may react with the lithium-nickel composite oxide and a part of titanium used for the coating treatment may form a solid solution with the lithium-nickel composite oxide. For example, titanium in the coating layer can form a solid solution with the lithium-nickel composite oxide depending on the conditions of a thermal treatment performed after the coating treatment.

As titanium in the coating layer forms a solid solution with the lithium-nickel composite oxide, there is an effect of preventing the lithium-nickel composite oxide particles which do not form a solid solution with titanium from coming into direct contact with the electrolyte solution, and not only diminishing the opportunity of an interfacial reaction, but also suppressing the reaction itself between the lithium-nickel composite oxide and the electrolyte solution caused by an increase in the potential. However, it is preferable to adjust the degree of solid-solving so that the effect of improving the cycle characteristics by the positive electrode active material can be exerted sufficiently.

The degree of solid-solving of the coating layer in the lithium-nickel composite oxide can be attained from the quotient (hereinafter, coated metal surface amount) of the amount ratio (Tis/Nis) of Ti to Ni that are present on the surface and the ratio (Nib/(Nib+Cob+Mb)) of the amount of Ni to the sum of amounts of Ni, Co, and M in the entire positive electrode active material, which is determined from semi-quantitative analysis by X-ray photoelectron spectroscopy (XPS) and the chemical analysis by ICP described above.

Moreover, in the positive electrode active material according to one embodiment of the present invention, the quotient of the amount ratio (Tis/Nis) of Ti to Ni that are present on the surface and the ratio (Nib/(Nib+Cob+Mb)) of the amount of Ni to the sum of amounts of Ni, Co, and M in the entire positive electrode active material is preferably set to 0.07 or more and 0.30 or less. In this manner, it is possible to provide a positive electrode active material for a lithium ion secondary battery, which has a high capacity and exhibits excellent cycle characteristics, suppresses battery swelling due to gas generation, and both of which are achieved at a higher level.

Based on the characteristics of XPS, it is possible to selectively acquire information on the portion at a depth of 1 nm or more and 5 nm or less from the surface of the measurement target and thus to attain the composition ratio of the surface layer of the sample. The coated metal surface amount is preferably 0.07 or more and 0.3 or less. This is because it means that titanium existing as a coating layer, namely, titanium existing as a coating layer without being diffused into the lithium-nickel composite oxide particles is sufficiently secured and a coating layer which is sufficiently uniform to suppress a side reaction between the active material and the electrolyte solution is formed by setting the coated metal surface amount to 0.07 or more.

On the other hand, by providing a coating layer, the cycle characteristics are improved and the battery swelling can be suppressed but, at the same time, there is the possibility that the internal resistance increases. This is because it is preferable to set the coated metal surface amount to 0.3 or less since it is possible to reliably prevent the coating layer from hindering the reaction for lithium deintercalation and intercalation of the lithium-nickel composite oxide and to suppress the internal resistance. It is more preferable that the coated metal surface amount is 0.14 or more and 0.3 or less since particularly both high cycle characteristics and low internal resistance can be achieved.

<1-3. Characteristics of Positive Electrode Active Material>

The lithium-nickel composite oxide particles and the coating layer have been so far described, but it is preferable that the positive electrode active material according to one embodiment of the present invention exhibits the following characteristics.

As described above, the positive electrode active material according to one embodiment of the present invention preferably contains only lithium-nickel composite oxide particles and a coating layer, but impurities are mixed into the positive electrode active material at the time of production in some cases. In particular, moisture and carbon are impurities which may be increased by the coating treatment. There is the possibility that moisture and carbon affect the cycle characteristics, and it is thus preferable that the moisture and carbon are controlled in predetermined ranges.

The positive electrode active material according to one embodiment of the present invention preferably has a carbon content of 0.05% by mass or more and 0.4% by mass or less, still more preferably 0.08% by mass or less. This is because it is possible to, for example, sufficiently suppress the generation of carbon dioxide due to decomposition of the organic components contained in the coating layer and the like during charge and discharge of a secondary battery fabricated using the positive electrode active material and to prevent the occurrence of battery expansion and the like by setting the carbon content to 0.4% by mass or less. However, carbon derived from carbon dioxide and the like in the air is almost inevitably mixed into the positive electrode active material of the present embodiment, and it is thus difficult to decrease the carbon content to less than 0.05% by mass. For this reason, the lower limit of carbon content is preferably set to 0.05% by mass. The carbon content can be evaluated, for example, by an infrared absorption method and the like.

In addition, the positive electrode active material according to one embodiment of the present invention preferably has a moisture amount (moisture content) of 0.2% by mass or less. By setting the moisture amount to 0.2% by mass or less, the hydrolysis reaction of the electrolyte in the electrolyte solution can be more reliably suppressed in a secondary battery fabricated using the positive electrode active material.

When the electrolyte in the electrolyte solution is hydrolyzed, acidic components such as hydrogen fluoride are generated and the acidic components react with the positive electrode active material to cause deterioration. However, as described above, it is preferable to set the moisture amount in the positive electrode active material according to one embodiment of the present invention to 0.2% by mass or less since the hydrolysis reaction of the electrolyte in the electrolyte solution can be more reliably suppressed and the deterioration can be suppressed. The moisture amount in the positive electrode active material according to one embodiment of the present invention is evaluated by the Karl Fischer method at a heating temperature of 300° C.

According to the positive electrode active material for a lithium ion secondary battery according to one embodiment of the present invention, it is possible to provide a positive electrode active material for a lithium ion secondary battery, which has a high capacity and exhibits excellent cycle characteristics, suppresses battery swelling due to gas generation, and both of which are achieved at a high level.

<2. Method for Producing Positive Electrode Active Material for Lithium Ion Secondary Battery>

Figure 1:
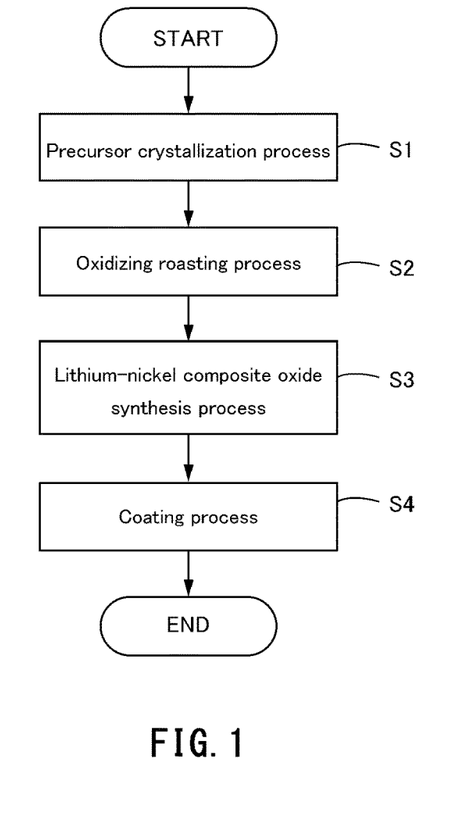
FIG. 1 is a flow chart schematically illustrating a method for producing a positive electrode active material for a lithium ion secondary battery according to one embodiment of the present invention.

Next, a method for producing a positive electrode active material for a lithium ion secondary battery according to one embodiment of the present invention will be described with reference to the drawings. FIG. 1 is a flow chart schematically illustrating the method for producing a positive electrode active material for a lithium ion secondary battery according to one embodiment of the present invention. The method for producing a positive electrode active material for a lithium ion secondary battery according to one embodiment of the present invention is a method for producing a positive electrode active material for a lithium ion secondary battery containing lithium-nickel composite oxide particles and a coating layer that covers at least a part of the surfaces of the lithium-nickel composite oxide particles.

Moreover, as illustrated in FIG. 1, the method for producing a positive electrode active material for a lithium ion secondary battery according to one embodiment of the present invention includes at least a precursor crystallization process S1, an oxidizing roasting process S2, a lithium-nickel composite oxide synthesis process S3, and a coating process S4. Hereinafter, every process will be described in detail. Incidentally, the following description is an example of the production method and does not limit the production method.

<2-1. Precursor Crystallization Process S1>

In the precursor crystallization process S1 for obtaining a nickel composite hydroxide, a nickel composite hydroxide which is a precursor of a lithium-nickel composite oxide is prepared by a crystallization reaction.

Specifically, for example, a mixed aqueous solution is prepared using water-soluble raw materials for the respective elements so that the amount ratio of the respective elements is Ni:Co:M=1−x−y:x:y and reacted with an aqueous alkali metal solution and the like in a reaction tank, whereby a nickel composite hydroxide can be obtained.

Incidentally, x and y in the above formula can be in the similar suitable ranges to those of x and y described in the lithium-nickel composite oxide particles.

In the precursor crystallization process S1, a metal compound containing nickel, a metal compound containing cobalt, and further a metal compound containing an element M in some cases are dissolved in water at predetermined proportions to prepare a raw material mixed aqueous solution (preparation of raw material mixed aqueous solution).

The amount ratio of the respective metals in the raw material mixed aqueous solution is similar to the amount ratio in the nickel composite hydroxide to be finally obtained. Hence, it is preferable to prepare the raw material mixed aqueous solution by adjusting the amount ratio of the respective metals in the raw material mixed aqueous solution by the proportions of the metal compounds to be dissolved in water so as to have the same ratio as the amount ratio of the respective metals in the nickel composite hydroxide particles intended. The metal compounds are only required to be water-soluble, and sulfates, chlorides, nitrates and the like can be used, but sulfates are preferable from the viewpoint of cost. Incidentally, in a case in which suitable water-soluble metal compounds for the element M and the like are not found, the element M and the like may be added in the oxidizing roasting process S2 and lithium-nickel composite oxide synthesis process S3 to be described later instead of being added to the raw material mixed aqueous solution.

Next, water is poured into the reaction tank, and an alkaline substance and an ammonium ion donor are added thereto in proper amounts to prepare an initial aqueous solution (preparation of initial aqueous solution). At this time, it is preferable to prepare the initial aqueous solution so that the pH value of the initial aqueous solution is 11.2 or more and 12.2 or less based on a liquid temperature of 25° C. and the ammonia concentration is 2 g/L or more and 15 g/L or less.

When the precursor crystallization process S1 is performed to prepare a nickel composite hydroxide, there is a case in which impurities derived from the anions constituting the metal compounds contained in the raw material mixed aqueous solution used are mixed into the nickel composite hydroxide. However, it is preferable to set the pH value of the initial aqueous solution to 11.2 or more since it is possible to suppress the mixing of impurities derived from the anions constituting the metal compounds of the raw materials. In addition, by setting the pH value of the initial aqueous solution to 12.2 or less, the nickel composite hydroxide particles to be obtained can be suppressed from becoming fine particles and can have an optimal size.

In addition, it is preferable to set the ammonia concentration in the initial aqueous solution to 2 g/L or more since it is possible to easily form the nickel composite hydroxide particles to be obtained in a spherical shape. Moreover, it is preferable to set the ammonia concentration in the initial aqueous solution to 15 g/L or less since it is possible to prevent the solubility of nickel to form an ammonia complex from excessively increasing and to more reliably set the amount ratio of the nickel composite hydroxide to be obtained to the intended amount ratio.

Incidentally, the alkaline substance used when preparing the initial aqueous solution is not particularly limited but is preferably one or more selected from sodium carbonate, sodium hydrogen carbonate, potassium carbonate, sodium hydroxide, or potassium hydroxide. It is preferable to add the alkaline substance in the form of an aqueous solution since the added amount can be easily adjusted. In addition, the ammonium ion donor is not particularly limited, but one or more selected from aqueous ammonium carbonate solution, ammonia water, aqueous ammonium chloride solution, or aqueous ammonium sulfate solution can be preferably used.

In the precursor crystallization process S1, a reaction aqueous solution can be prepared by dropping the raw material mixed aqueous solution into the initial aqueous solution, but it is preferable that the pH value of and ammonia concentration in the reaction aqueous solution are maintained in the above-mentioned suitable ranges.

The atmosphere in the reaction tank is preferably a non-oxidizing atmosphere, for example, an atmosphere having an oxygen concentration of 1% by volume or less. This is because it is preferable that the atmosphere is a non-oxidizing atmosphere, for example, an atmosphere having an oxygen concentration of 1% by volume or less since oxidation of the raw material compounds and the like can be suppressed. For example, precipitation of oxidized cobalt as fine particles can be prevented.

The temperature in the reaction tank in the precursor crystallization process S1 is maintained preferably at 40° C. or more and 60° C. or less, more preferably at 45° C. or more and 55° C. or less. Incidentally, in order to maintain the reaction tank in such a temperature region, it is preferable that the initial aqueous solution and reaction aqueous solution disposed in the reaction tank are also maintained in the similar temperature range.

The temperature of the reaction tank spontaneously rises by the reaction heat and the energy of stirring, and it is thus preferable to set the temperature to 40° C. or more since extra energy is not consumed for cooling. In addition, it is preferable to set the intra-tank temperature to 60° C. or less since the evaporation of ammonia from the initial aqueous solution and reaction aqueous solution can be suppressed and the intended ammonia concentration is easily maintained.

Moreover, in the precursor crystallization process S1, the crystallization reaction of the nickel composite hydroxide particles which are a precursor can proceed by pouring the initial aqueous solution into the reaction tank, and adjusting the temperature and the like, then continuously dropping the raw material mixed aqueous solution into the reaction tank at a constant rate, and reacting these solutions (crystallization).

As described above, it is preferable that the pH value of and ammonia concentration in the reaction aqueous solution are in the similar suitable ranges as those described for the initial aqueous solution. For this reason, when the mixed aqueous solution is dropped into the initial aqueous solution or the reaction aqueous solution, it is preferable that the ammonium ion donor and the alkaline substance are also dropped into the initial aqueous solution or the reaction aqueous solution at a constant rate. Moreover, it is preferable to control the pH value of the reaction aqueous solution so as to be maintained at 11.2 or more and 12.2 or less based on a liquid temperature of 25° C. and the ammonia concentration to be maintained at 2 g/L or more and 15 g/L or less.

Thereafter, the slurry containing these nickel composite hydroxide particles collected from the overflow port provided to the reaction tank is filtered and dried, whereby powdery nickel composite hydroxide particles which are a precursor can be obtained.

<2-2. Oxidizing Roasting Process S2>

Next, the oxidizing roasting process S2 will be described. In the oxidizing roasting process S2, the nickel composite hydroxide obtained in the precursor crystallization process S1 is oxidized and roasted to obtain a nickel composite oxide. In the oxidizing roasting process S2, the nickel composite oxide can be obtained by firing the nickel composite hydroxide in an oxygen-containing atmosphere and then cooling the resultant to room temperature.

The roasting conditions in the oxidizing roasting process S2 are not particularly limited, but it is preferable to perform firing in an oxygen-containing atmosphere, for example, in an air atmosphere at a temperature of 500° C. or more and 700° C. or less for 1 hour or more and 12 hours or less. This is because it is preferable to set the firing temperature to 500° C. or more since the nickel composite hydroxide particles can be completely converted to a nickel composite oxide. In addition, this is because it is preferable to set the firing temperature to 700° C. or less since it is possible to suppress the specific surface area of nickel composite oxide from becoming excessively small.

It is preferable to set the firing time to 1 hour or more since it is possible to uniformly maintain the temperature in the firing container and to uniformly conduct the reaction. In addition, a significant change is not observed in the nickel composite oxide to be obtained even when the firing is performed for a time longer than 12 hours, and it is thus preferable to set the firing time to 12 hours or less from the viewpoint of energy efficiency.

It is preferable that the oxygen concentration in the oxygen-containing atmosphere at the time of the thermal treatment is equal to or higher than the oxygen concentration in the air atmosphere, that is, the oxygen concentration is 20% by volume or more. The upper limit of the oxygen concentration in the oxygen-containing atmosphere can be set to 100% by volume since the atmosphere can be an oxygen atmosphere.

Incidentally, for example, in a case in which the compound containing the element M has not been coprecipitated in the precursor crystallization process S1, for example, a compound containing the element M may be added to the nickel composite hydroxide to be subjected to the oxidizing roasting process S2 so as to have the same composition ratio as the intended composition ratio and firing may be performed. The compound containing the element M to be added is not particularly limited, and for example, an oxide, a hydroxide, a carbonate, or any mixture thereof can be used.

In a case in which slight sintering is observed in the nickel composite oxide particles after termination of the oxidizing roasting process, a crushing treatment may be additionally performed.

<2-3. Lithium-Nickel Composite Oxide Synthesis Process S3>

In the lithium-nickel composite oxide synthesis process S3, the nickel composite oxide obtained in the oxidizing roasting process S2 and a lithium compound are mixed and fired to obtain a lithium-nickel composite oxide.

In the lithium-nickel composite oxide synthesis process S3, a lithium mixture can be obtained by adding and mixing a lithium compound to the nickel composite oxide obtained in the oxidizing roasting process S2 so that the amount of lithium is 95% or more and 120% or less with respect to the sum of the amounts of the component metal elements contained in this composite oxide (preparation of lithium mixture).

The lithium compound to be added is not particularly limited, and for example, lithium hydroxide, lithium nitrate, lithium carbonate, or any mixture thereof can be used. As the lithium compound, it is particularly preferable to use lithium hydroxide having a low melting point and a high reactivity.

Next, the lithium mixture obtained is fired in an oxygen-containing atmosphere and then cooled to room temperature, whereby a lithium-nickel composite oxide can be obtained (firing). The firing conditions are not particularly limited, but it is preferable to perform firing, for example, at a temperature of 700° C. or more and 800° C. or less for 1 hour or more and 24 hours or less.

Incidentally, the oxygen-containing atmosphere is preferably an atmosphere containing oxygen at 80% by volume or more. This is because it is preferable to set the oxygen concentration in the atmosphere to 80% by volume or more since the cation mixing in which Ni atoms are mixed into the Li sites in the lithium-nickel composite oxide to be obtained can be particularly suppressed. The upper limit of the oxygen concentration in the oxygen-containing atmosphere can be set to 100% by volume since the atmosphere can be an oxygen atmosphere.

Moreover, it is preferable to set the firing temperature to 700° C. or more since the crystal structure of the lithium-nickel composite oxide can be sufficiently grown. In addition, it is preferable to set the firing temperature to 800° C. or less since the above cation mixing can be suppressed.

It is preferable to set the firing time to 1 hour or more since it is possible to uniformly maintain the temperature in the firing container and to uniformly conduct the reaction. In addition, a significant change is not observed in the lithium-nickel composite oxide to be obtained even when the firing is performed for a time longer than 24 hours, and it is thus preferable to set the firing time to 24 hours or less from the viewpoint of energy efficiency.

Incidentally, in a case in which slight sintering is observed in the lithium-nickel composite oxide to be obtained after the lithium-nickel composite oxide synthesis process S3, a crushing treatment may be additionally performed.

<2-4. Coating Process S4>

In the coating process S4, a coating layer containing a Ti compound is formed on at least a part of the surfaces of the lithium-nickel composite oxide particles obtained in the lithium-nickel composite oxide synthesis process S3.

In the coating process S4, a Ti compound is added so that the Ti amount attributed to the Ti compound is 7.0 μmol or more and 60 μmol or less per 1 $m^2$ surface area of the lithium-nickel composite oxide.

In the coating process S4, the specific surface area of the lithium-nickel composite oxide obtained in the lithium-nickel composite oxide synthesis process S3 can be measured at first and a liquid coating agent can be prepared depending on the intended titanium surface amount in the coating layer (preparation of coating agent).

The coating agent is not particularly limited as long as it contains titanium or a titanium compound. As the coating agent, a titanium compound dissolved in a solvent, a titanium compound with a low melting point which is liquid at normal temperature or melted by a thermal treatment at a low temperature, and the like can be preferably used for uniform coating.

Examples of the titanium compound include one or more kinds selected from alkoxides such as titanium tetraisopropoxide and titanium tetrabutoxide and chelates such as titanium acetylacetonate and titanium lactate ammonium salt. Particularly as the coating agent, it is possible to preferably use the coating agent in which metal titanium is dissolved in a mixed aqueous solution of hydrogen peroxide and ammonia, which can be prepared easily, and which can suppress mixing of impurities thereinto.

In the coating process S4, next, the lithium-nickel composite oxide particles and the coating agent can be mixed. A general mixer can be used for mixing (preparation of mixture). Moreover, after mixing, drying is performed (drying) and, if necessary, a thermal treatment is further performed to fix a titanium compound as a coating layer (thermal treatment).

In the above-mentioned drying, drying can be performed at a temperature at which the solvent and the like in the coating agent can be removed. For example, drying can be performed at 80° C. or more and less than 300° C.

The thermal treatment conditions in the above-mentioned thermal treatment are not particularly limited, but it is preferable to perform the thermal treatment in an oxygen-containing atmosphere, for example, an air atmosphere at a temperature of 300° C. or more and 600° C. or less for 1 hour or more and 5 hours or less. After the thermal treatment, the resultant is cooled to room temperature to obtain a positive electrode active material which is lithium-nickel composite oxide particles having a coating layer as a final product.

It is preferable that the oxygen concentration in the oxygen-containing atmosphere at the time of the thermal treatment is equal to or higher than the oxygen concentration in the air atmosphere, that is, the oxygen concentration is 20% by volume or more. This is because it is preferable that the oxygen concentration in the oxygen-containing atmosphere at the time of the thermal treatment is equal to or higher than the oxygen concentration in the air atmosphere since the creation of oxygen defect in the positive electrode active material to be obtained can be particularly suppressed. The upper limit of the oxygen concentration in the oxygen-containing atmosphere can be set to 100% by volume since the atmosphere can be an oxygen atmosphere.

It is preferable to set the maximum temperature at the time of the thermal treatment to 300° C. or more since impurities contained in the coating agent can be particularly suppressed from remaining in the positive electrode active material. In addition, it is preferable to set the maximum temperature to 600° C. or less since the components of the coating layer are suppressed from being excessively diffused into the positive electrode active material and the form of coating layer can be maintained. Incidentally, maximum temperature at the time of the thermal treatment is preferably selected depending on the intended titanium surface amount in the coating layer and the like so that the thickness of the coating layer can be sufficiently maintained.

It is preferable to set the processing time for the thermal treatment to 1 hour or more since impurities contained in the coating agent can be particularly suppressed from remaining in the positive electrode active material. In addition, a significant change is not observed in the positive electrode active material to be obtained even when the thermal treatment is performed for a time longer than 5 hours, and it is thus preferable to set the processing time to 5 hours or less from the viewpoint of energy efficiency.

In a case in which slight sintering is observed in the positive electrode active material obtained after the coating process S4, a crushing treatment may be additionally performed.

Incidentally, the thermal treatment may not be carried out. In other words, the process up to the preparation of mixture can be carried out to produce the positive electrode active material. This is because the coating layer can be uniformly and firmly formed on the surfaces of the lithium-nickel composite oxide particles using a liquid coating agent even if the thermal treatment is not performed. It is preferable to perform drying in order to decrease and remove the solvent, moisture and the like in the coating agent, if necessary, even in a case in which the above-mentioned thermal treatment is not carried out.

As described above, the components other than oxygen of the lithium-nickel composite oxide obtained in the lithium-nickel composite oxide synthesis process S3 are represented by $Li:Ni:Co:M=t:1-x-y:x:y$ (where, M is at least one element selected from the group consisting of Mg, Al, Ca, Si, Ti, V, Fe, Cu, Cr, Zn, Zr, Nb, Mo, or W, $0.95 \leq t \leq 1.20$, $0 < x \leq 0.22$, and $0 \leq y \leq 0.15$) and the quotient of the amount ratio ($Ti_s/Ni_s$) of Ti to Ni that are present on the surface of the positive electrode active material for a lithium ion secondary battery and the ratio ($Ni_b/(Ni_b+Co_b+M_b)$) of the amount of Ni to the sum of the amounts of Ni, Co, and M in the entire positive electrode active material is 0.07 or more and 0.30 or less.

According to the method for producing a positive electrode active material for a lithium ion secondary battery according to one embodiment of the present invention, it is possible to provide a positive electrode active material for a lithium ion secondary battery, which has a high capacity and exhibits excellent cycle characteristics, suppresses battery swelling due to gas generation, and both of which are achieved at a high level.

<3. Lithium Ion Secondary Battery>

A lithium ion secondary battery (hereinafter, also referred to as "secondary battery") according to one embodiment of the present invention contains the positive electrode active material described above in the positive electrode. Hereinafter, the secondary battery according to one embodiment of the present invention will be described for every component. The secondary battery according to one embodiment of the present invention can have a configuration equipped with a positive electrode containing the positive electrode active material described above, a negative electrode, a separator, and a non-aqueous electrolyte solution. It should be noted that the embodiments to be described below are merely examples and the non-aqueous electrolyte secondary battery can be implemented in various modified and improved forms based on the knowledge of those skilled in the art including the following embodiment. Moreover, the application of the secondary battery is not particularly limited.

<3-1. Positive Electrode>

The positive electrode is a sheet-shaped member and can be formed by applying, for example, a positive electrode mixture paste containing the positive electrode active material described above on a surface of, for example, an aluminum foil current collector and drying the paste. In addition, the positive electrode can be formed by molding a positive electrode mixture. Incidentally, the positive electrode is appropriately treated depending on the battery to be used. For example, it is also possible to perform a cutting treatment for forming the positive electrode in a proper size depending on the battery intended or a pressure compression treatment using a roll press and the like in order to increase the electrode density.

The positive electrode mixture paste described above can be formed by adding a solvent to the positive electrode mixture if necessary and kneading the mixture. Moreover, the positive electrode mixture can be formed by mixing the powdery positive electrode active material described above, a conductive material, and a binding agent.

The conductive material is added to impart proper conductivity to the electrode. The material for the conductive material is not particularly limited, but it is possible to use, for example, graphite such as natural graphite, artificial graphite, and expanded graphite and carbon black-based materials such as acetylene black and Ketjen Black (registered trademark).

The binding agent plays a role of retaining the positive electrode active material. The binding agent to be used in such a positive electrode mixture is not particularly limited, but it is possible to use one or more selected from, for example, polyvinylidene fluoride (PVDF), polytetrafluoroethylene (PTFE), fluorine rubber, ethylene propylene diene rubber, styrene butadiene, a cellulose-based resin, and polyacrylic acid.

Incidentally, activated carbon and the like can be added to the positive electrode mixture. By adding activated carbon and the like to the positive electrode mixture, it is possible to increase the electric double layer capacity of positive electrode.

The solvent has an action of dissolving the binding agent and dispersing the positive electrode active material, the conductive material, activated carbon, and the like in the binding agent. The solvent is not particularly limited, but it is possible to use, for example, organic solvents such as N-methyl-2-pyrrolidone.

In addition, the mixing ratio of the respective materials in the positive electrode mixture paste is not particularly limited and may be, for example, similar to that in the case of a positive electrode of a general lithium ion secondary battery. For example, in a case in which the solid content in the positive electrode mixture excluding the solvent is 100 parts by mass, the content of positive electrode active material can be set to 60 parts by mass or more and 95 parts by mass or less, the content of conductive material can be set to 1 part by mass or more and 20 parts by mass or less, and the content of binding agent can be set to 1 part by mass or more and 20 parts by mass or less.

However, the method for fabricating the positive electrode is not limited to the example described above, and another method may be used.

<3-2. Negative Electrode>

The negative electrode is a sheet-like member formed by applying a negative electrode mixture paste on the surface of a metal foil current collector such as copper and drying the paste. In addition, the negative electrode can also be, for example, a sheet-like member composed of a material containing lithium such as metal lithium.

The negative electrode is formed by a method substantially similar to that for the positive electrode described above and subjected to various treatments if necessary similarly to the positive electrode although the components constituting the negative electrode mixture paste and the composition thereof, the material for the current collector, and the like are different from those of the positive electrode.

The negative electrode mixture paste can be prepared by adding a proper solvent to a negative electrode mixture in which a negative electrode active material and a binding agent are mixed together and forming the mixture into a paste. As the negative electrode active material, for example, a material containing lithium such as metal lithium or a lithium alloy and an intercalation material capable of intercalating and deintercalating lithium ions can be employed.

The intercalation material is not particularly limited, but it is possible to use one or more selected from, for example, natural graphite, artificial graphite, organic compound fired bodies such as a phenol resin, and powders of carbon materials such as coke. In a case in which such an intercalation material is employed as the negative electrode active material, a fluorine-containing resin such as PVDF can be used as a binding agent similarly to the positive electrode and an organic solvent such as N-methyl-2-pyrrolidone can be used as a solvent for dispersing the negative electrode active material in the binding agent.

<3-3. Separator>

The separator is disposed to be sandwiched between the positive electrode and the negative electrode and has a function of separating the positive electrode and the negative electrode from each other and holding the electrolyte. The material for the separator is not particularly limited as long as it has the above function, but it is possible to use, for example, a thin film such as polyethylene and polypropylene, which film is having a large number of fine pores.

<3-4. Non-Aqueous Electrolyte Solution>

The non-aqueous electrolyte solution is obtained by dissolving a lithium salt as a supporting salt in an organic solvent. As the organic solvent, one kind selected from cyclic carbonates such as ethylene carbonate, propylene carbonate, butylene carbonate, and trifluoropropylene carbonate; chain carbonates such as diethyl carbonate, dimethyl carbonate, ethyl methyl carbonate, and dipropyl carbonate; ether compounds such as tetrahydrofuran, 2-methyltetrahydrofuran, and dimethoxyethane; sulfur compounds such as ethylmethyl sulfone and butane sultone; and phosphorus compounds such as triethyl phosphate and trioctyl phosphate can be used singly or two or more kinds thereof can be used in mixture.

As the supporting salt, $LiPF_6$, $LiBF_4$, $LiClO_4$, $LiAsF_6$, $LiN(CF_3SO_2)_2$, and any composite salt thereof can be used. Incidentally, the non-aqueous electrolyte solution may contain a radical scavenger, a surfactant, a flame retardant and the like in order to improve the battery characteristics.

<3-5. Shape and Configuration of Secondary Battery>

Next, examples of the disposition and configuration of members of the secondary battery of the present embodiment will be described. The secondary battery of the present embodiment including the positive electrode, negative electrode, separator, and non-aqueous electrolyte solution described above can be fabricated in various shapes such as a cylindrical shape and a stacked shape. Even in the case of taking any shape, the positive electrode and the negative electrode can be laminated with the separator interposed therebetween to form an electrode body and the electrode body obtained can be impregnated with the non-aqueous electrolyte solution. Thereafter, the positive electrode current collector and the positive electrode terminal communicating with the outside are connected to each other using a current collecting lead or the like and the negative electrode current collector and the negative electrode terminal communicating with the outside are connected to each other using a current collecting lead or the like, and these are sealed in the battery case, whereby a secondary battery can be obtained.

<3-6. Characteristics of Secondary Battery>

The secondary battery according to one embodiment of the present invention fabricated using the positive electrode active material described above can achieve high capacity and excellent cycle characteristics, suppress battery swelling due to gas generation, both at a high level.

Specifically, the initial discharge capacity, which is the discharge capacity in a case in which a 2032 type coin battery is fabricated using the positive electrode active material of the present embodiment in the positive electrode, charged to a cutoff voltage of 4.3 V at a current density of 0.13 mA/cm², paused for one hour, and is then discharged to a cutoff voltage of 3.0 V, is preferably 180 mAh/g or more, more preferably 185 mAh/g or more.

The cycle characteristics are evaluated by the capacity retention. The capacity retention can be evaluated, for example, by the following procedure. For example, a coin-type battery is configured in which the negative electrode is a sheet formed by applying a negative electrode mixture paste obtained by mixing graphite powder with polyvinylidene fluoride to a copper foil. Thereafter, the coin-type battery is subjected to conditioning to repeat a cycle, in which the coin-type battery is charged to a cutoff voltage of 4.3 V at a current density of 0.33 mA/cm$^2$ in a thermostat kept at 25° C., paused for one hour, and is then discharged to a cutoff voltage of 3.0 V, for five times. Next, a cycle in which the coin-type battery is charged to a cutoff voltage of 4.3 V at a current density of 2.7 mA/cm$^2$ in a thermostat kept at 60° C., paused for one hour, and is then discharged to a cutoff voltage of 3.0 V is repeated 200 times.

Thereafter, a proportion attained by dividing the discharge capacity attained in the 200th cycle after conditioning by the discharge capacity attained in the first cycle after conditioning can be taken as the capacity retention.

In addition, the secondary battery of the present embodiment fabricated using the positive electrode active material described above preferably has a capacity retention of preferably 85% or more, more preferably 90% or more.

The battery swelling can be evaluated by the thickness of battery after the high voltage holding test of a laminated cell. The laminate-type battery having the same structure as that for the cycle test is subjected to conditioning, charged to 4.3 V at 0.27 mA/cm$^2$, and continuously charged while being held at 4.3 V until the current value becomes 1/10. After the charged battery is kept at 60° C. for 3 days, the battery is returned to normal temperature and sandwiched between SUS plates so that the short side of the battery protrudes by 10 mm, and the SUS plates are pressurized at 3.9 kN. The thickness at the center of the portion of the battery protruding from the SUS plates can be taken as the degree of battery expansion.

In addition, the secondary battery of the present embodiment fabricated using the positive electrode active material described above has a battery swelling of preferably 0.20 mm or less, preferably 0.15 mm or less.

The application of the secondary battery according to one embodiment of the present invention is not particularly limited, and the secondary battery can be suitably used in applications requiring various power sources. In particular, the secondary battery according to one embodiment of the present invention exhibits the characteristics described above and thus can be suitably used in power sources of small-sized portable electronic devices (notebook personal computers, mobile phone terminals and the like) which are required to exhibit high cycle characteristics and high capacity at all times. In addition, the secondary battery of the present embodiment exhibits excellent cycle characteristics and can be miniaturized and thus is suitable as a power source for electric cars which is repeatedly charged and discharged and is mounted in a limited space.

EXAMPLES

Next, an active material for a non-aqueous electrolyte secondary battery, a method for producing a positive electrode active material for a non-aqueous secondary battery, and a non-aqueous electrolyte secondary battery according to one embodiment of the present invention will be described in more detail with reference to Examples. In addition, the present invention should not be limited to these Examples. Incidentally, the analysis method of metals contained in the positive electrode active material and various evaluation methods of the positive electrode active material in Examples and Comparative Examples are as follows.

Example 1

1. Production of Lithium-Nickel Composite Oxide Particles

A positive electrode active material was produced by carrying out the following processes.

(a) Precursor Crystallization Process

First, 2.5 L of pure water was placed in a reaction tank (5 L), and the temperature in the tank was set to 40° C. while performing stirring. At this time, the interior of the reaction tank was in a nitrogen atmosphere having an oxygen concentration of 1% by volume or less. An initial aqueous solution was prepared by adding proper amounts of a 25% by mass aqueous sodium hydroxide solution and 25% by mass ammonia water to the water in this reaction tank so that the pH value was 11.5 based on a liquid temperature of 25° C. and the ammonia concentration was 5 g/L (preparation of initial aqueous solution).

At the same time, a raw material mixed aqueous solution at 2.0 mol/L was prepared by dissolving nickel sulfate, cobalt sulfate, and aluminum sulfate in pure water so that the amount ratio among nickel, cobalt, and aluminum was Ni:Co:Al=0.82:0.15:0.03 (preparation of raw material mixed aqueous solution).

This raw material mixed aqueous solution was dropped to the initial aqueous solution in the reaction tank at 10 ml/min to obtain a reaction aqueous solution. At this time, 25% by mass ammonia water and 25% by mass aqueous sodium hydroxide solution were also dropped to the initial aqueous solution at constant rates so that the pH value of the reaction aqueous solution was controlled to be maintained at 11.5 based on a liquid temperature of 25° C. and the ammonia concentration was controlled to be maintained at 5 g/L. By such an operation, a nickel composite hydroxide (hereinafter, referred to as "composite hydroxide") as a precursor of a lithium-nickel composite oxide was crystallized (crystallization)

Thereafter, the slurry containing the composite hydroxide collected as an overflow from the overflow port provided to the reaction tank was filtered, and water-soluble impurities were washed and removed with ion-exchanged water, then the resultant was dried at 120° C. for a whole day and night to obtain a powdery composite hydroxide.

(b) Oxidizing Roasting Process

The composite hydroxide fabricated above was fired at 600° C. for 2 hours in an air atmosphere having an oxygen concentration of 20% by volume using an atmosphere firing furnace (BM-50100M manufactured by SILICONIT Co., Ltd.), and then cooled to room temperature to obtain nickel composite oxide particles.

(c) Lithium-Nickel Composite Oxide Synthesis Process

Lithium hydroxide monohydrate weighed so that the ratio of the amount of lithium to the sum of the amounts of nickel, cobalt, and aluminum contained in this composite oxide was 1.02 was added to the nickel composite oxide, and mixing was performed using a turbula shaker mixer (T2F manufactured by DALTON Corporation) to obtain a lithium mixture (preparation of lithium mixture).

The lithium mixture was introduced into an alumina sagger, fired at 750° C. for 10 hours in an oxygen-nitrogen mixed gas atmosphere having an oxygen concentration of 90% by volume using an atmosphere firing furnace (BM-50100M manufactured by SILICONIT Co., Ltd.), and then cooled to room temperature (firing). In this manner, lithium-nickel composite oxide particles were obtained.

2. Evaluation of Lithium-Nickel Composite Oxide Particles (a) Chemical Composition It was confirmed that the amount ratio of the respective metal elements in the lithium-nickel composite oxide was represented by Li:Ni:Co:Al=1.02:0.82:0.15:0.03 by quantitative analysis using an ICP emission spectrophotometer (725ES manufactured by Varian Medical Systems Inc.).

(b) Crystal Structure

The crystal structure of these lithium-nickel composite oxide particles was measured using XRD (X'Pert PROMRD manufactured by Malvern Panalytical Ltd.) and confirmed to be a layered rock-salt crystal structure in which a peak attributed to an R-3m structure was detected in the diffraction pattern.

(c) Specific Surface Area

The BET specific surface area of this lithium-nickel composite oxide was measured using a full automatic BET specific surface area analyzer (Macsorb manufactured by MOUNTECH Co., Ltd.). As a result, it was confirmed that the specific surface area was 0.29 m$^2$/g.

(d) Volume Average Particle Size

The volume average particle size of this lithium-nickel composite oxide was measured using a laser diffraction scattering type particle size distribution analyzer (Microtrack HRA manufactured by Nikkiso Co., Ltd.). As a result, it was confirmed that the volume average particle size was 11.9 μm.

3. Production of Positive Electrode Active Material

A positive electrode active material was produced by subjecting the lithium-nickel composite oxide to the following coating process. The entire surface area of the lithium-nickel composite oxide to be coated was calculated from the mass and specific surface area of the lithium-nickel composite oxide. Thereafter, sponge-like titanium metal weighed so that the amount of titanium per 1 m$^2$ of the entire surface area was 7.0 μmol was put in 83 ml of a 30% by mass hydrogen peroxide solution per 1 g of sponge-like titanium, 23 ml of 25% by mass ammonia water per 1 g of sponge-like titanium was dropped to the mixture while performing stirring, while the mixture was cooled in a water bath so that the temperature of the reaction vessel was in the range of 20° C. or more and 25° C. or less to dissolve the sponge-like titanium (preparation of coating agent).

A sponge-like titanium solution diluted with ion-exchanged water so that the content of titanium was 0.36 g per 1 L of the solution and 3.6 g of lithium-nickel composite oxide per 1 ml of sponge-like titanium solution were mixed by a rotary and revolutionary stirring device (model: KK-400W manufactured by KURABO INDUSTRIES LTD.) (preparation of mixture).

The lithium-nickel composite oxide mixed with the sponge-like titanium solution was dried at 120° C. (drying), and then fired for 5 hours at 300° C. in an air atmosphere using an atmosphere firing furnace (BM-50100M manufactured by SILICONIT Co., Ltd.) (thermal treatment). Thereafter, the resultant was cooled to room temperature to obtain a lithium-nickel composite oxide having a coating layer as a positive electrode active material.

4. Evaluation of Positive Electrode Active Material

The positive electrode active material thus obtained was subjected to the following evaluation.

(a) Composition

It has been found that this positive electrode active material contains Ti at 0.01% by mass by analysis using an ICP emission spectrophotometer (725ES manufactured by Varian Medical Systems Inc.) and the titanium surface amount in the coating layer determined from the specific surface area before the coating treatment is 7.0 μmol/m$^2$.

(b) Surface Analysis

The positive electrode active material obtained was subjected to measurement using XPS (Versa Probe II manufactured by ULVAC-PHI, INCORPORATED), the amounts of Ni and Ti on the surface of the positive electrode active material was attained from the semi-quantitative value calculated from the peak areas of the Ni$^2$P$_{3/2}$ spectrum and Ti$^2$P$_{3/2}$ spectrum obtained, and the amount ratio (Tis/Nis) of Ti to Ni present on the surface and the ratio (Nib/(Nib+Cob+Mb)) of the amount of Ni to the sum of the amounts of Ni, Co, and M in the entire positive electrode active material were determined together with the results of the compositional analysis. The coated metal surface amount which was the quotient of the two, (Tis/Nis)/(Nib/(Nib+Cob+Alb)) (amount ratio) was 0.07.

(c) Carbon Content

The carbon content in the positive electrode active material obtained was measured by a high frequency combustion infrared absorption method using a carbon analyzer (model: CS-600 manufactured by LECO Corporation) and found to be 0.13% by mass.

(d) Moisture Amount

The moisture amount in the positive electrode active material obtained was measured at a vaporization temperature of 300° C. using a Karl Fischer moisture meter (model: MKC210 manufactured by KYOTO ELECTRONICS MANUFACTURING CO., LTD.) and found to be 0.01% by mass.

5. Fabrication of Secondary Battery

Figure 2:
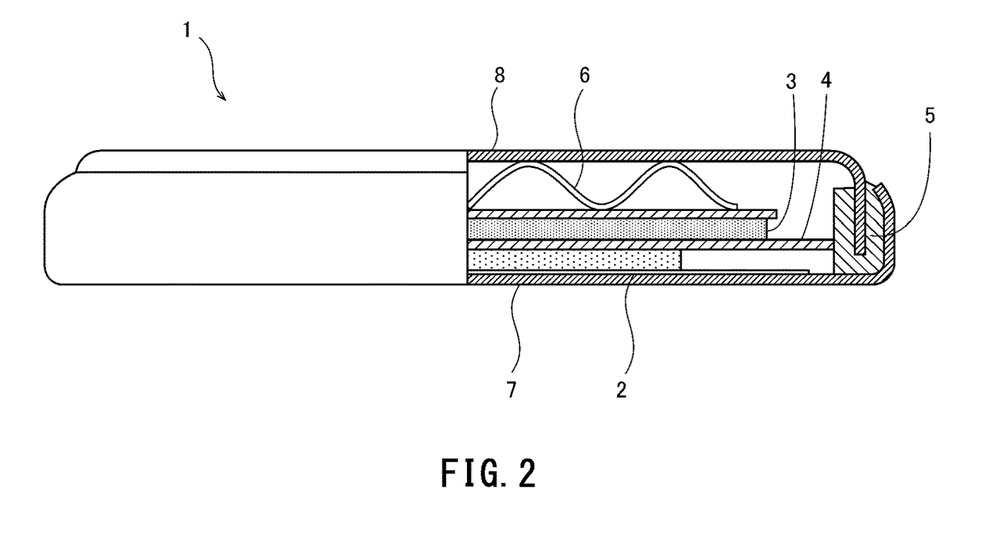
FIG. 2 is a schematic cross-sectional view of a coin-type secondary battery used for evaluation of battery characteristics.

For the evaluation of the capacity of the positive electrode active material obtained, a 2032 type coin battery 1 (hereinafter, referred to as "coin-type battery") having a structure illustrated in FIG. 2 was used. A coin-type battery 1 includes a case, electrodes accommodated in the case, and a wave washer 6.

The case includes a positive electrode can 7 having a hollow and opened one end and a negative electrode can 8 disposed at an opening of the positive electrode can 7 and is configured so that a space for accommodating the electrodes is formed between the negative electrode can 8 and the positive electrode can 7 when the negative electrode can 8 is disposed at the opening of the positive electrode can 7.

In addition, the electrodes include a positive electrode 2, a separator 4, and a negative electrode 3, and they are stacked so as to be arranged in this order, and are accommodated in the cases so that the positive electrode 2 is in contact with the inner surface of the positive electrode can 7 and the negative electrode 3 is in contact with the inner surface of the negative electrode can 8. Incidentally, the case includes a gasket 5, and the relative movement between the positive electrode can 7 and the negative electrode can 8 is fixed by this gasket 5 so as to maintain a non-contact state.

In addition, the gasket 5 also has a function of sealing a gap between the positive electrode can 7 and the negative electrode can 8 to air-tightly and liquid-tightly isolate the interior of the case from the outside. Such a coin-type battery 1 was fabricated as follows.

First, a slurry prepared by dispersing 20.0 g of the positive electrode active material obtained, 2.35 g of acetylene black, and 1.18 g of polyvinylidene fluoride in N-methyl-2-pyrrolidone (NMP) was applied on an Al foil so that 5.0 mg of the positive electrode active material was present per 1 cm$^2$ of the Al foil, and then dried at 120° C. for 30 minutes in the air to remove NMP. The Al foil coated with the positive electrode active material was cut into a strip shape having a width of 66 mm and roll-pressed at a load of 1.2 t to fabricate the positive electrode 2. The positive electrode 2 was punched into a circle having a diameter of 13 mm and dried in a vacuum dryer at 120° C. for 12 hours.

Next, the coin-type battery 1 was fabricated using the positive electrode 2 in a glove box in an Ar atmosphere having a dew point managed to −80° C. At this time, a lithium foil punched into a disk shape having a diameter of 14 mm was used as the negative electrode 3.

Figure 3A:
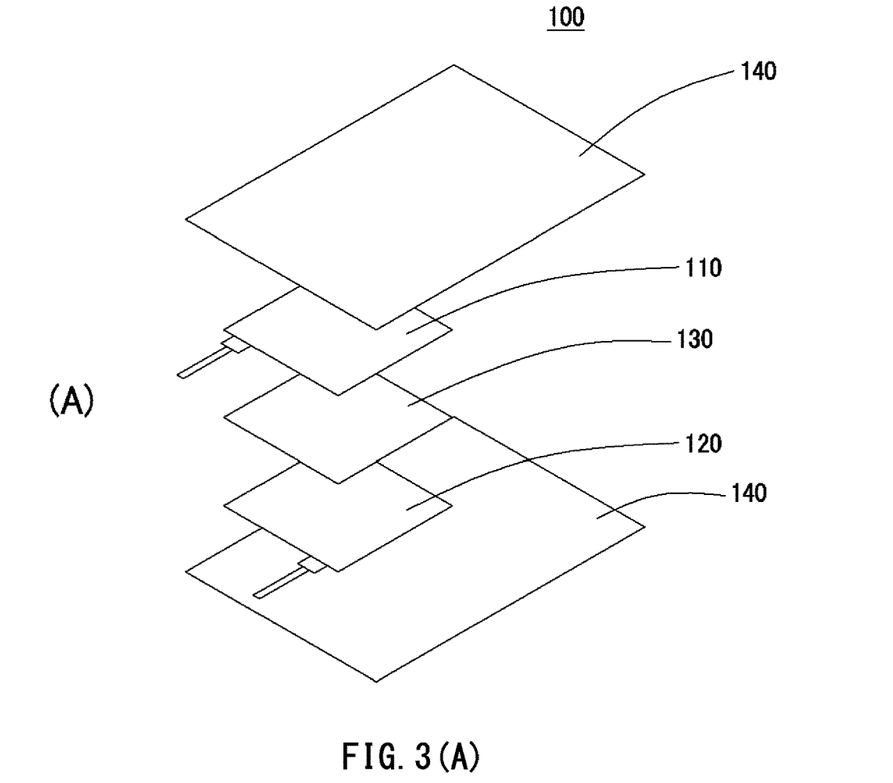
FIG. 3(A) is a schematic explanatory view of a laminated cell.
Figure 3B:
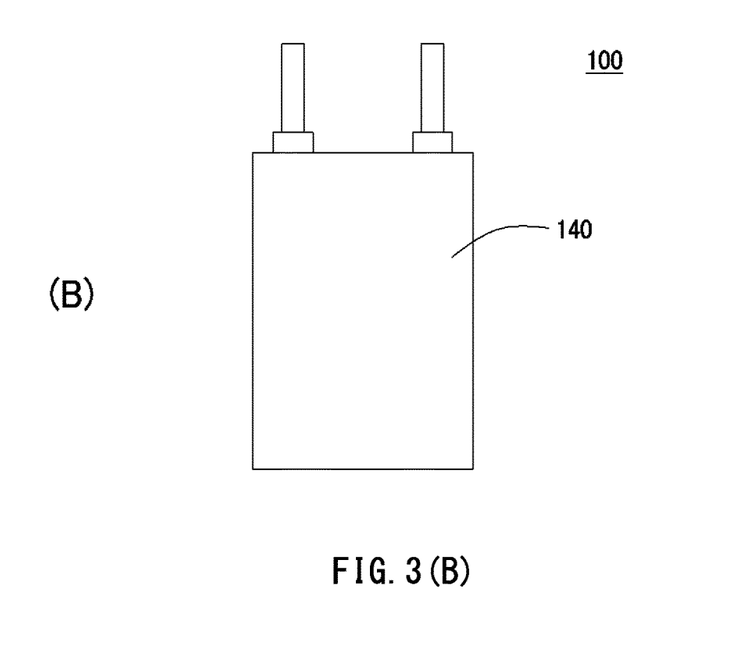
FIG. 3(B) is a front view of the laminated cell.

A laminate-type battery 100 illustrated in FIGS. 3(A) and 3(B) was used for the evaluation on cycle characteristics and battery expansion. Such a laminate-type battery 100 was fabricated as follows. A positive electrode 110 was fabricated by the similar method to that in the coin cell, cut into a rectangle of 50 mm×30 mm, and dried in a vacuum dryer at 120° C. for 12 hours. Next, the laminate-type battery 100 was fabricated using the positive electrode 110 in a dry room having a dew point managed to −80° C. At this time, a negative electrode sheet in which a negative electrode mixture paste which was a mixture of graphite powder having an average particle size of about 20 μm and polyvinylidene fluoride was applied on a copper foil was used as a negative electrode 120.

In addition, a polyethylene porous film having a thickness of 25 μm was used as a separator 130 and a 3:7 mixed solution (manufactured by TOMIYAMA PURE CHEMICAL INDUSTRIES, LTD.) of ethylene carbonate (EC) and diethyl carbonate (DEC) containing 1 M of LiPF$_6$ as a supporting electrolyte was used as the electrolyte solution. Thereafter, the resultant was sealed with laminate films 140 to complete the laminate-type battery 100.

6. Evaluation of Secondary Battery

The initial discharge capacity, internal resistance, and cycle characteristics indicating the performance of the coin-type secondary battery fabricated were evaluated as follows.

(a) Initial Discharge Capacity

The initial discharge capacity was evaluated by measuring a discharge capacity (initial discharge capacity) when a coin-type battery including a lithium foil in the negative electrode was fabricated, then left to stand for about 24 hours to stabilize the open circuit voltage (OCV), then charged to a cutoff voltage of 4.3 V at a current density of 0.13 mA/cm$^2$ for the positive electrode, paused for one hour, and was then discharged to a cutoff voltage of 3.0 V. The measurement result was 190 mAh/g.

(b) Cycle Characteristics

The cycle characteristics were evaluated by measuring the capacity retention when 200 cycles of charge and discharge were performed. Specifically, a laminate-type battery including a negative electrode fabricated using a sheet in which a mixture of graphite powder and polyvinylidene fluoride was applied on a copper foil was first subjected to conditioning to repeat a cycle, in which the laminate-type battery was charged to a cutoff voltage of 4.3 V at a current density of 0.33 mA/cm$^2$ in a thermostat kept at 25° C., paused for one hour, and was then discharged to a cutoff voltage of 3.0 V, for five times. Next, a cycle in which the laminate-type battery was charged to a cutoff voltage of 4.3 V at a current density of 2.7 mA/cm$^2$ in a thermostat kept at 60° C., paused for one hour, and was then discharged to a cutoff voltage of 3.0 V was repeated 200 times, and the discharge capacity in each cycle was measured to perform the evaluation.

Moreover, the capacity retention of the laminate-type battery in Example 1, which was a proportion attained by dividing the discharge capacity attained in the 200th cycle after conditioning by the discharge capacity attained in the first cycle after conditioning, was 92%.

The laminate-type battery having the same structure as that for the cycle test was subjected to conditioning, then charged to 4.3 V at 0.27 mA/cm$^2$, and continuously charged while being held at 4.3 V until the current value became $\frac{1}{10}$. The charged battery was kept at 60° C. for 3 days. Thereafter, the battery was returned to normal temperature and sandwiched between SUS plates so that the short side of the battery is protruded by 10 mm, and the SUS plates were pressurized at 3.9 kN. The thickness at the center of the portion of the battery protruding from the SUS plates was measured using a dial gauge and taken as the degree of battery expansion. Moreover, the thickness of the battery after the holding test of the laminate-type battery in Example 1 was 0.12 mm.

As the judging methods for the discharge capacity evaluation, capacity retention evaluation, and battery swelling evaluation of the battery obtained above, the characteristics were judged by the following three-level evaluation (1, 2, 3, 4).

Discharge Capacity (mAh/g)

1: 179 or less, 2: 180 to 184, 3: 185 to 189, 4: 190 or more (The performance is higher as the number of three-level evaluation is greater. The same applies hereinafter.)

Capacity Retention (%)

1: 81 or less, 2: 82 to 86, 3: 87 to 91, 4: 92 or more

Battery Swelling (Mm)

1:0.21 or more, 2:0.17 to 0.20, 3:0.13 to 0.16, 4:0.12 or less

Moreover, the sum of the respective evaluations was adopted as the overall evaluation, and it was judged as ⊙ when the overall evaluation was 11 or more, ○ when 9 to 10, Δ when 7 to 8, and x when 6 or less. The evaluation results are presented in Tables 1 and 2.

Example 2

Lithium-nickel composite oxide particles, a positive electrode active material, and a secondary battery fabricated using the positive electrode active material were obtained under the same conditions as in Example 1 except that the intended titanium surface amount in the coating layer was set to 14 μmol/m$^2$ in the preparation of coating agent when carrying out the coating process in "3. Production of positive electrode active material". The evaluation results are presented in Tables 1 and 2.

Example 3

Lithium-nickel composite oxide particles, a positive electrode active material, and a secondary battery fabricated using the positive electrode active material were obtained under the same conditions as in Example 1 except that the intended titanium surface amount in the coating layer was set to 29 μmol/m² in the preparation of coating agent when carrying out the coating process in "3. Production of positive electrode active material". The evaluation results are presented in Tables 1 and 2.

Example 4

Lithium-nickel composite oxide particles, a positive electrode active material, and a secondary battery fabricated using the positive electrode active material were obtained under the same conditions as in Example 1 except that the intended titanium surface amount in the coating layer was set to 58 μmol/m² in the preparation of coating agent when carrying out the coating process in "3. Production of positive electrode active material". The evaluation results are presented in Tables 1 and 2.

Example 5

Lithium-nickel composite oxide particles, a positive electrode active material, and a secondary battery fabricated using the positive electrode active material were obtained under the same conditions as in Example 3 except that the coating agent used for coating was titanium tetrabutoxide diluted with ethanol when carrying out the coating process in "3. Production of positive electrode active material". The evaluation results are presented in Tables 1 and 2.

Comparative Example 1

Lithium-nickel composite oxide particles, a positive electrode active material, and a secondary battery fabricated using the positive electrode active material were obtained under the same conditions as in Example 1 except that the coating process in Example 1 was not carried out. The evaluation results are presented in Tables 1 and 2. Incidentally, the coating process was not carried out, and thus the lithium-nickel composite oxide obtained in "1. Production of lithium-nickel composite oxide particles" became the positive electrode active material.

Comparative Example 2

Lithium-nickel composite oxide particles, a positive electrode active material, and a secondary battery fabricated using the positive electrode active material were obtained under the same conditions as in Example 1 except that the intended titanium surface amount in the coating layer was set to 159 μmol/m² in the preparation of coating agent when carrying out the coating process in "3. Production of positive electrode active material". The evaluation results are presented in Tables 1 and 2.

TABLE 1

|  | Titanium coating solution | Ti grade (% by mass) | Ti amount per unit area (μmol/m²) | (Tis/Nis)/ (Nib/(Nib + Cob + Mb)) (mol/mol) | Carbon content (% by mass) | Moisture content (% by mass) |
|---|---|---|---|---|---|---|
| Example 1 | Sponge-like titanium dissolved in hydrogen peroxide and ammonia water | 0.01 | 7 | 0.07 | 0.13 | 0.01 |
| Example 2 | Same as Example 1 | 0.02 | 14 | 0.14 | 0.14 | 0.01 |
| Example 3 | Same as Example 1 | 0.04 | 29 | 0.29 | 0.14 | 0.03 |
| Example 4 | Same as Example 1 | 0.08 | 58 | 0.58 | 0.17 | 0.04 |
| Example 5 | Titanium tetrabutoxide diluted with ethanol | 0.04 | 29 | 0.29 | 0.41 | 0.09 |
| Comparative Example 1 | Nil | 0 | — | — | 0.08 | 0.06 |
| Comparative Example 2 | Same as Example 1 | 0.22 | 159 | 0.98 | 0.17 | 0.04 |

TABLE 2

|  | Discharge capacity (mAh/g) | Capacity retention (%) | Battery swelling (mm) | Discharge capacity evaluation | Capacity retention evaluation | Battery swelling evaluation | Overall evaluation | Overall judgement |
|---|---|---|---|---|---|---|---|---|
| Example 1 | 190 | 92 | C.12 | 4 | 4 | 4 | 12 | ⊙ |
| Example 2 | 190 | 92 | C.13 | 4 | 4 | 3 | 11 | ⊙ |
| Example 3 | 188 | 93 | C.12 | 3 | 4 | 4 | 11 | ⊙ |
| Example 4 | 187 | 93 | C.13 | 3 | 4 | 3 | 10 | ○ |
| Example 5 | 188 | 90 | C.16 | 3 | 3 | 3 | 9 | ○ |
| Comparative Example 1 | 190 | 80 | C.39 | 4 | 1 | 1 | 6 | X |
| Comparative Example 2 | 179 | 86 | C.12 | 1 | 2 | 4 | 7 | Δ |

As presented in Table 1, the secondary batteries fabricated using the positive electrode active materials obtained in Examples 1 to 5 were evaluated as ◯ or ⊙ in the overall judgment and were excellent in discharge capacity, capacity retention, and prevention of battery swelling. The components other than oxygen of the positive electrode active materials obtained in Examples were all represented by Li:Ni:Co:M=t:1−x−y:x:y (0.95≤t≤1.20, 0<x≤0.22, and 0≤y≤0.15), the coating layer contained a Ti compound, and the Ti amount per 1 $m^2$ surface area of the lithium-nickel composite oxide was 7.0 μmol or more and 60 μmol or less. It is considered that the capacity is high, the cycle characteristics are excellent, and the battery swelling due to gas generation can be suppressed in this manner.

Moreover, in Examples 1 to 3 in which (Tis/Nis)/(Nib/(Nib+Cob+Mb)) was 0.07 or more and 0.30 or less, the overall judgment was ⊙ and the results were superior to those in Example 4 in which (Tis/Nis)/(Nib/(Nib+Cob+Mb)) was out of this range.

Furthermore, in Examples 1 to 3 in which the carbon content was 0.40% by mass or less, the results of overall judgment were superior to that in Example 5 in which the carbon content was more than 0.40% by mass.

On the other hand, in the positive electrode active material of Comparative Example 1, a Ti compound was not added, thus the capacity retention evaluation and the battery swelling evaluation were 1, and these results were inferior to those in Examples. In Comparative Example 2, a Ti compound was added, but the amount of Ti per 1 $m^2$ surface area of the lithium-nickel composite oxide exceeded 7.0 μmol to 60 μmol, and it is considered that the amount is excessive. The overall judgment in Comparative Examples were x or Δ, the results were inferior to the results in Examples.

As described above, by the positive electrode active material for a lithium ion secondary battery, the method for producing a positive electrode active material for a lithium ion secondary battery, and a lithium ion secondary battery according to one embodiment of the present invention, the capacity and cycle characteristics were excellent, the battery swelling due to gas generation was suppressed, and both of which were achieved at a high level.

In the present embodiment, it is possible to obtain a positive electrode active material for a lithium ion secondary battery, which exhibits excellent capacity and cycle characteristics, suppresses battery swelling due to gas generation, and both of which are achieved at a high level, by an industrial production method. A lithium ion secondary battery fabricated using this positive electrode active material for a lithium ion secondary battery is suitable for power sources of small-sized portable electronic devices (notebook personal computers, mobile phone terminals and the like) which are required to have a high capacity and a long service life at all times.

In addition, the secondary battery according to one embodiment of the present invention is superior to batteries fabricated using conventional positive electrode active materials containing lithium-cobalt-based oxides or lithium-nickel-based oxides in safety and further in capacity, cycle characteristics, and prevention of battery swelling due to gas generation. Hence, the secondary battery according to one embodiment of the present invention can be miniaturized and have a longer service life and thus is suitable as a power source for electric cars to be mounted in a limited space.

In addition, the positive electrode active material according to one embodiment of the present invention and a secondary battery fabricated using the same can be used not only as a power source for electric cars driven by purely electric energy but also as a power source for so-called hybrid cars used in combination with a combustion engine such as a gasoline engine or a diesel engine and as a stationary storage battery.

Incidentally, each embodiment and each Example of the present invention have been described in detail as described above, but it will be readily apparent to those skilled in the art that many modifications can be made without departing substantially from new matters and effects of the present invention. Hence, such modified examples are all included in the scope of the present invention.

For example, in the specification or the drawings, a term described at least once together with a broader or synonymous different term can be replaced with the different term anywhere in the specification or the drawings. In addition, the configurations and operations of the positive electrode active material for a lithium ion secondary battery, the method for producing a positive electrode active material for a lithium ion secondary battery, and the lithium ion secondary battery are not limited to those described in each embodiment and each Example of the present invention, and various modifications can be made.

GLOSSARY OF DRAWING REFERENCES

S1 Precursor crystallization process
S2 Oxidizing roasting process
S3 Lithium-nickel composite oxide synthesis process
S4 Coating process
1 Coin-type battery
2 Positive electrode (evaluation electrode)
3 Negative electrode (lithium metal)
4 Separator
5 Gasket
6 Wave washer
7 Positive electrode can
8 Negative electrode can
100 Laminate-type battery
110 Positive electrode
120 Negative electrode
130 Separator
140 Laminate film

The invention claimed is:

1. A positive electrode active material for a lithium ion secondary battery, comprising lithium-nickel composite oxide particles and a coating layer that covers at least a part of surfaces of the lithium-nickel composite oxide particles, wherein components other than oxygen of the lithium-nickel composite oxide are represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, or W, 0.95≤t≤1.20, 0<x≤0.22, and 0≤y≤0.15), and the coating layer contains a Ti compound, wherein a Ti amount per 1 $m^2$ surface area of the lithium-nickel composite oxide is 7.0 μmol or more and 60 μmol or less.

2. The positive electrode active material for a lithium ion secondary battery according to claim 1, wherein a quotient of an amount ratio (Tis/Nis) of Ti to Ni that are present on a surface of the positive electrode active material for a lithium ion secondary battery and a ratio (Nib/(Nib+Cob+Mb)) of an amount of Ni to a sum of amounts of Ni, Co, and M in an entire positive electrode active material is 0.07 or more and 0.30 or less.

3. The positive electrode active material for a lithium ion secondary battery according to claim 1, wherein a carbon content is 0.05% by mass or more and 0.40% by mass or less with respect to 100% by mass of the entire positive electrode active material for a lithium ion secondary battery.

4. The positive electrode active material for a lithium ion secondary battery according to claim 3, wherein the carbon content is 0.08% by mass or less.

5. The positive electrode active material for a lithium ion secondary battery according to claim 1, wherein a specific surface area of the lithium-nickel composite oxide is 0.1 m$^2$/g or more and 1.0 m$^2$/g or less.

6. The positive electrode active material for a lithium ion secondary battery according to claim 1, wherein the lithium-nickel composite oxide is a layered rock-salt type compound particle having a crystal structure belonging to a space group R-3m.

7. A lithium ion secondary battery comprising at least a positive electrode containing the positive electrode active material for a lithium ion secondary battery according to claim 1, a negative electrode, a separator, and a non-aqueous electrolyte solution.

8. A method for producing a positive electrode active material for a lithium ion secondary battery comprising lithium-nickel composite oxide particles and a coating layer that covers at least a part of surfaces of the lithium-nickel composite oxide particles, the method comprising at least:
a precursor crystallization process for preparing a nickel composite hydroxide that is a precursor of the lithium-nickel composite oxide by a crystallization reaction;
an oxidizing roasting process for oxidizing and roasting the nickel composite hydroxide obtained in the precursor crystallization process to obtain a nickel composite oxide;
a lithium-nickel composite oxide synthesis process for mixing the nickel composite oxide obtained in the oxidizing roasting process with a lithium compound to obtain a mixture and firing the mixture to obtain a lithium-nickel composite oxide; and
a coating process for forming the coating layer containing a Ti compound on at least a part of surfaces of particles of the lithium-nickel composite oxide obtained in the lithium-nickel composite oxide synthesis process.

9. The method for producing a positive electrode active material for a lithium ion secondary battery according to claim 8, wherein
a Ti compound is added so that a Ti amount attributed to the Ti compound is 7.0 μmol or more and 60 μmol or less per 1 m$^2$ surface area of the lithium-nickel composite oxide in the coating process,
components other than oxygen of the lithium-nickel composite oxide obtained in the coating process are represented by Li:Ni:Co:M=t:1−x−y:x:y (where, M is at least one element selected from the group consisting of Mg, Al, Ca, Si, Ti, V, Fe, Cu, Cr, Zn, Zr, Nb, Mo, or W, 0.95≤t≤1.20, 0<x≤0.22, and 0≤y≤0.15), and
a quotient of an amount ratio (Tis/Nis) of Ti to Ni that are present on a surface of the positive electrode active material for a lithium ion secondary battery and a ratio (Nib/(Nib+Cob+Mb)) of an amount of Ni to a sum of amounts of Ni, Co, and M in an entire positive electrode active material is 0.07 or more and 0.30 or less.

10. The method for producing a positive electrode active material for a lithium ion secondary battery according to claim 8, wherein firing is performed at a temperature of 700° C. or more and 800° C. or less in an oxygen-containing atmosphere in the lithium-nickel composite oxide synthesis process.

\* \* \* \* \*